US011990284B2

(12) United States Patent
Lee et al.

(10) Patent No.: US 11,990,284 B2
(45) Date of Patent: *May 21, 2024

(54) MULTILAYERED ELECTRONIC COMPONENT

(71) Applicant: SAMSUNG ELECTRO-MECHANICS CO., LTD., Suwon-si (KR)

(72) Inventors: Jong Ho Lee, Suwon-si (KR); Seon Jae Mun, Suwon-si (KR); Gi Long Kim, Suwon-si (KR); Tae Gyeom Lee, Suwon-si (KR); Byung Rok Ahn, Suwon-si (KR); Kyoung Jin Cha, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 126 days.

This patent is subject to a terminal disclaimer.

(21) Appl. No.: 17/730,645

(22) Filed: Apr. 27, 2022

(65) Prior Publication Data

US 2022/0392706 A1 Dec. 8, 2022

(30) Foreign Application Priority Data

May 25, 2021 (KR) .................. 10-2021-0066992
Dec. 29, 2021 (KR) .................. 10-2021-0190588

(51) Int. Cl.
*H01G 4/30* (2006.01)
*H01G 4/008* (2006.01)
*H01G 4/012* (2006.01)
*H01G 4/12* (2006.01)

(52) U.S. Cl.
CPC .............. *H01G 4/30* (2013.01); *H01G 4/008* (2013.01); *H01G 4/012* (2013.01); *H01G 4/12* (2013.01)

(58) Field of Classification Search
CPC ........ H01G 4/0085; H01G 4/30; H01G 4/012; H01G 4/1227; H01G 4/2325; H01G 4/1209; H01G 4/228; H01G 4/306; H01G 2/02; H01G 4/008; H01G 4/1218; H01G 4/232
See application file for complete search history.

(56) References Cited

U.S. PATENT DOCUMENTS

| 6,366,444 | B1* | 4/2002 | Yagi ............... H10N 30/877 361/321.1 |
| 9,236,185 | B1* | 1/2016 | Oguni ............... H01G 4/1227 |
| 2004/0179326 | A1* | 9/2004 | Hattori ............... H01G 4/30 361/320 |
| 2011/0110014 | A1* | 5/2011 | Hirata ............... H01G 4/005 156/89.12 |

(Continued)

FOREIGN PATENT DOCUMENTS

| JP | 2018-103509 A | 7/2018 |
| KR | 10-2015-0050421 A | 5/2015 |

*Primary Examiner* — Michael P McFadden
(74) *Attorney, Agent, or Firm* — Morgan, Lewis & Bockius LLP

(57) ABSTRACT

A multilayer electronic component according to an exemplary embodiment of the present disclosure may control connectivity of an end of an internal electrode, thereby suppressing occurrence of a short circuit between the internal electrodes, reduced capacitance or lower breakdown voltage. The internal electrode may include a plurality of conductor portions and a plurality of cut-off portions.

24 Claims, 11 Drawing Sheets

(56) References Cited

U.S. PATENT DOCUMENTS

| | | | |
|---|---|---|---|
| 2013/0049532 A1* | 2/2013 | Kim | ........................ H01C 7/18 |
| | | | 361/321.1 |
| 2014/0177133 A1* | 6/2014 | Lee | ...................... H01G 4/1209 |
| | | | 361/321.4 |
| 2014/0376150 A1* | 12/2014 | Kim | ........................ H01G 4/30 |
| | | | 361/301.4 |
| 2015/0116898 A1 | 4/2015 | Takashima et al. | |
| 2017/0365411 A1* | 12/2017 | Taniguchi | ................ H01G 4/30 |
| 2019/0259535 A1* | 8/2019 | Kowase | ................ H01G 4/228 |

* cited by examiner

MULTILAYERED ELECTRONIC COMPONENT

CROSS-REFERENCE TO RELATED APPLICATION(S)

This application claims the benefit of priority to Korean Patent Application Nos. 10-2021-0066992 filed on May 25, 2021 in the Korean Intellectual Property Office, and 10-2021-0190588 filed on Dec. 29, 2021 in the Korean Intellectual Property Office, the disclosures of which are incorporated herein by reference in their entirety.

BACKGROUND

1. Technical Field

The present disclosure relates to a multilayer electronic component.

2. Description of Related Art

A multilayer ceramic capacitor (MLCC), a multilayer electronic component, may be a chip-type condenser mounted on a printed circuit board of any of various electronic products, such as an image display device including a liquid crystal display (LCD) or a plasma display panel (PDP), a computer, a smartphone or a mobile phone, to serve to charge or discharge electricity therein or therefrom.

The multilayer ceramic capacitor has a small size, implements high capacitance, may be easily mounted on a circuit board, and may thus be used as a component of various electronic devices. There has been increasing demand for a multilayer ceramic capacitor having a smaller size and higher capacitance as each of various electronic devices such as a computer and a mobile device has a smaller size and higher output.

In order for the multilayer ceramic capacitor to have the smaller size and higher capacitance, required is technology in which each of an internal electrode and a dielectric layer has a smaller thickness.

However, as the internal electrode has the smaller thickness, a problem may occur such as a short circuit between the internal electrodes, reduced capacitance or lower breakdown voltage.

SUMMARY

An aspect of the present disclosure may provide a multilayer electronic component having improved reliability.

Another aspect of the present disclosure may improve connectivity of an end of an internal electrode.

Another aspect of the present disclosure may provide a multilayer electronic component including an internal electrode having excellent smoothness.

Another aspect of the present disclosure may provide a reliable multilayer electronic component having a smaller size and higher capacitance.

Another aspect of the present disclosure may provide a multilayer electronic component having excellent productivity and high reliability.

However, the present disclosure is not limited to the description above, and may be more readily understood in the description of exemplary embodiments of the present disclosure.

According to an aspect of the present disclosure, a multilayer electronic component may include: a body including a plurality of dielectric layers and a plurality of first internal electrodes and a plurality of second internal electrodes alternately disposed in a first direction with a dielectric layer interposed therebetween, and including first and second surfaces opposing each other in the first direction, third and fourth surfaces connected to the first and second surfaces and opposing each other in a second direction, and fifth and sixth surfaces connected to the first to fourth surfaces and opposing each other in a third direction; a first external electrode disposed on the third surface and connected to the plurality of first internal electrodes; and a second external electrode disposed on the fourth surface and connected to the plurality of second internal electrodes, wherein the plurality of first internal electrodes are spaced apart from the fourth surface and each include a plurality of first conductor portions and first cut-off portions, and the plurality of second internal electrodes are spaced apart from the third surface and includes a plurality of second conductor portions and second cut-off portions. an average value of connectivity of an end of a first internal electrode may be 60% or more, in which E1 is a region from a first conductor portion, which is closest to the second external electrode among the first conductor portions each having thickness and length of 80 nm or more among the plurality of first conductor portions, to a point of 10 μm toward an inner side of the first internal electrode, based on a cross-section of the body in a first-second direction, and the connectivity of the end of the first internal electrode is a ratio of a length of the first internal electrode, occupied by the plurality of first conductor portions in the region E1, to a length of the region E1.

According to another aspect of the present disclosure, a multilayer electronic component may include: a body including a plurality of dielectric layers and a plurality of first internal electrodes and a plurality of second internal electrodes alternately disposed in a first direction with a dielectric layer interposed therebetween, and including first and second surfaces opposing each other in the first direction, third and fourth surfaces connected to the first and second surfaces and opposing each other in a second direction, and fifth and sixth surfaces connected to the first to fourth surfaces and opposing each other in a third direction; a first external electrode disposed on the third surface and connected to the plurality of first internal electrodes; and a second external electrode disposed on the fourth surface and connected to the plurality of second internal electrodes. The plurality of first internal electrodes may be spaced apart from the fourth surface and each include a plurality of first conductor portions and first cut-off portions, and the plurality of second internal electrodes may be spaced apart from the third surface and each include a plurality of second conductor portions and second cut-off portions. An average value of E1s/F1s×100 may be 84 or more, in which, based on a cross-section of the body in a first-second direction, E1 is a region from a first conductor portion, which is closest to the second external electrode among the first conductor portions each having thickness and length of 80 nm or more among the plurality of first conductor portions, to a point of 10 μm toward an inner side of the first internal electrode, F1 is a region of the second internal electrode entirely overlapping the region E1 in the first direction, E1$s$ is an area occupied by the plurality of first conductor portions in the region E1, and F1$s$ is an area occupied by the plurality of second conductor portions in the region F1.

According to still another aspect of the present disclosure, a multilayer electronic component may include: a body including a plurality of dielectric layers and a plurality of first internal electrodes and a plurality of second internal electrodes alternately disposed in a first direction with a dielectric layer interposed therebetween, and including first and second surfaces opposing each other in the first direction, third and fourth surfaces connected to the first and second surfaces and opposing each other in a second direction, and fifth and sixth surfaces connected to the first to fourth surfaces and opposing each other in a third direction; a first external electrode disposed on the third surface and connected to the plurality of first internal electrodes; and a second external electrode disposed on the fourth surface and connected to the plurality of second internal electrodes. The plurality of first internal electrodes may be spaced apart from the fourth surface and each include a plurality of first conductor portions and first cut-off portions, and the plurality of second internal electrodes may be spaced apart from the third surface and each include a plurality of second conductor portions and second cut-off portions. An average value of a length of an end of a first internal electrode may be 4.2 μm or less, in which the length of the end of the first internal electrode is a length of the first internal electrode measured from an outer end of a first conductor portion closest to the second external electrode among the first conductor portions each having thickness and length of 80 nm or more among the plurality of first conductor portions to a first conductor portion closest to the second external electrode among the first conductor portions each having a length twice a thickness or greater among the plurality of first conductor portions.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
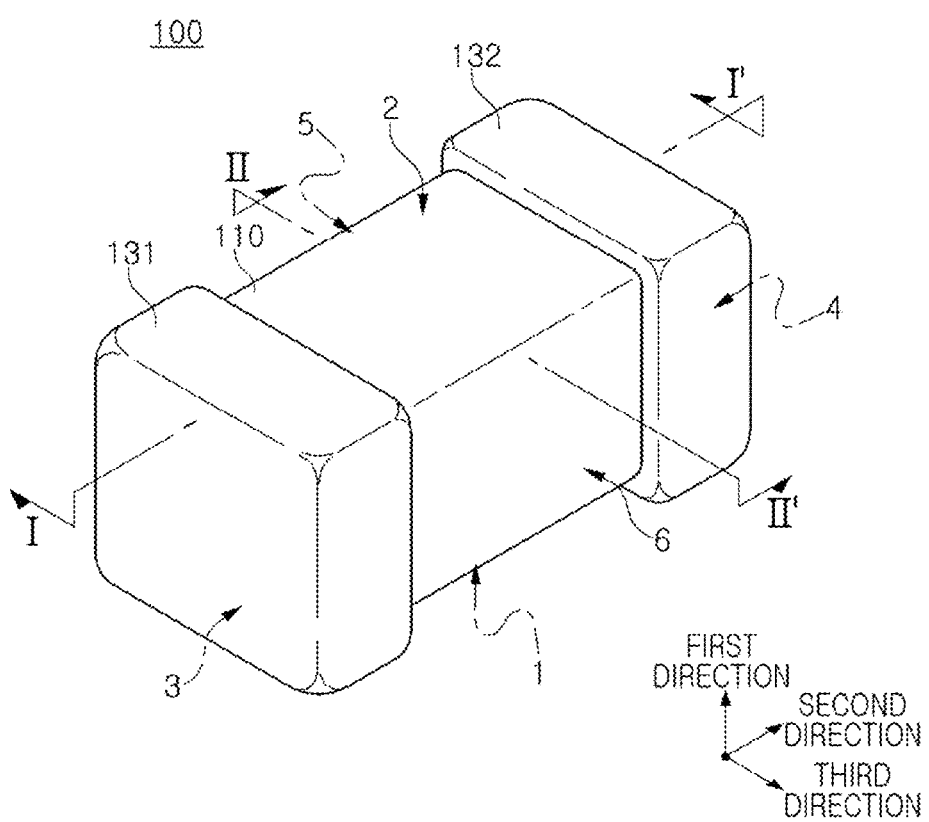
FIG. 1 is a perspective view schematically illustrating a multilayer electronic component according to an exemplary embodiment of the present disclosure.

Hereinafter, exemplary embodiments of the present disclosure will now be described in detail with reference to the accompanying drawings.

In the drawings, a first direction may indicate a thickness (T) direction, a second direction may indicate a length (L) direction, and a third direction may indicate a width (W) direction.

Multilayer Electronic Component

Figure 2:
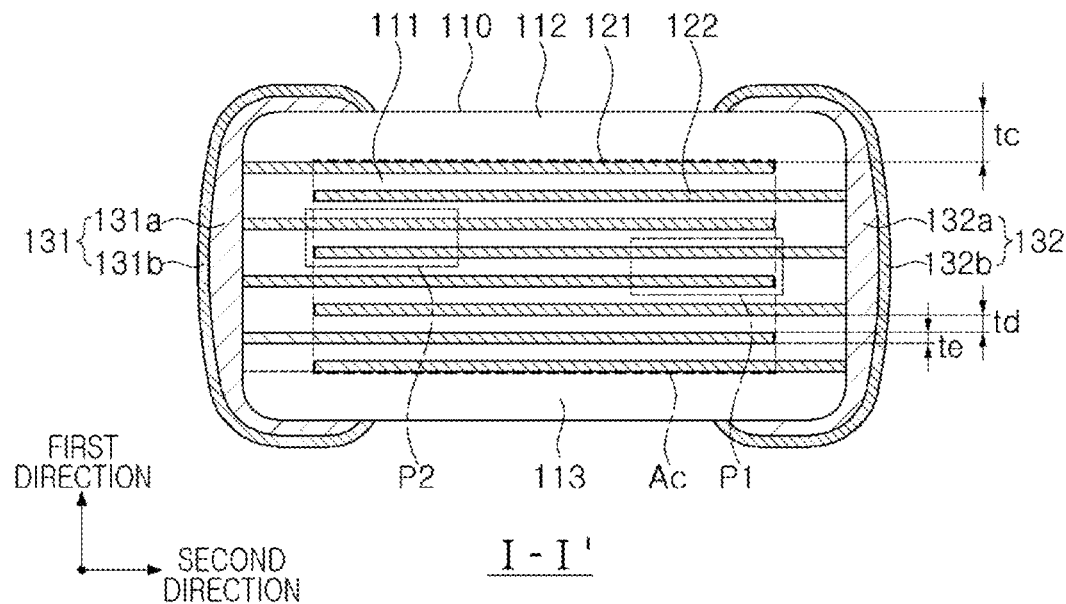
FIG. 2 is a cross-sectional view taken along line I-I' of FIG. 1.
Figure 3:
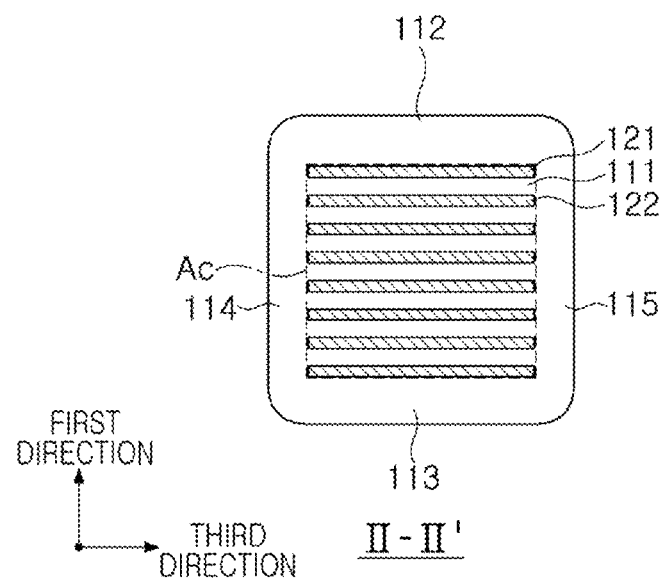
FIG. 3 is a cross-sectional view taken along line II-II' of FIG. 1.
Figure 4:
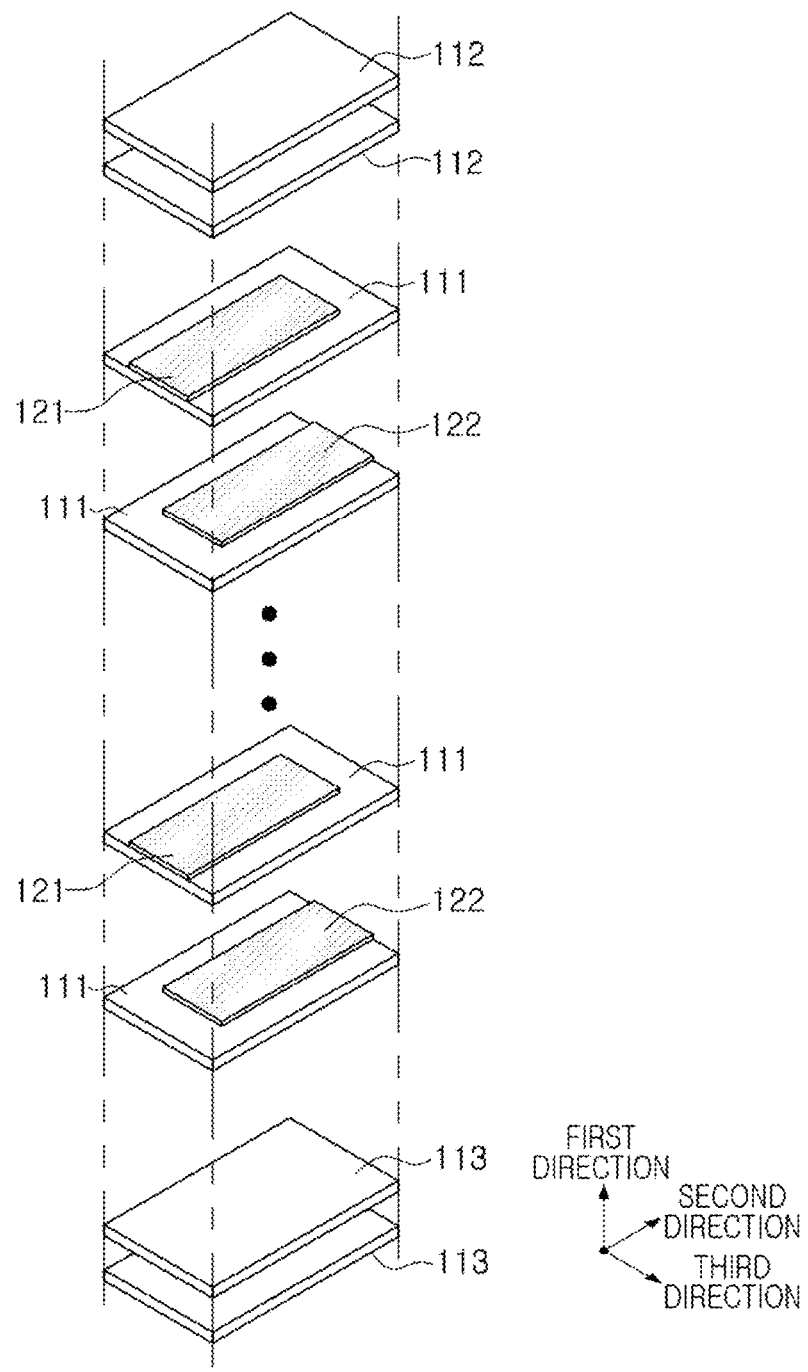
FIG. 4 is an exploded perspective view schematically illustrating an exploded capacitor body in which a dielectric layer and an internal electrode of FIG. 1 are stacked on each other.
Figure 5:
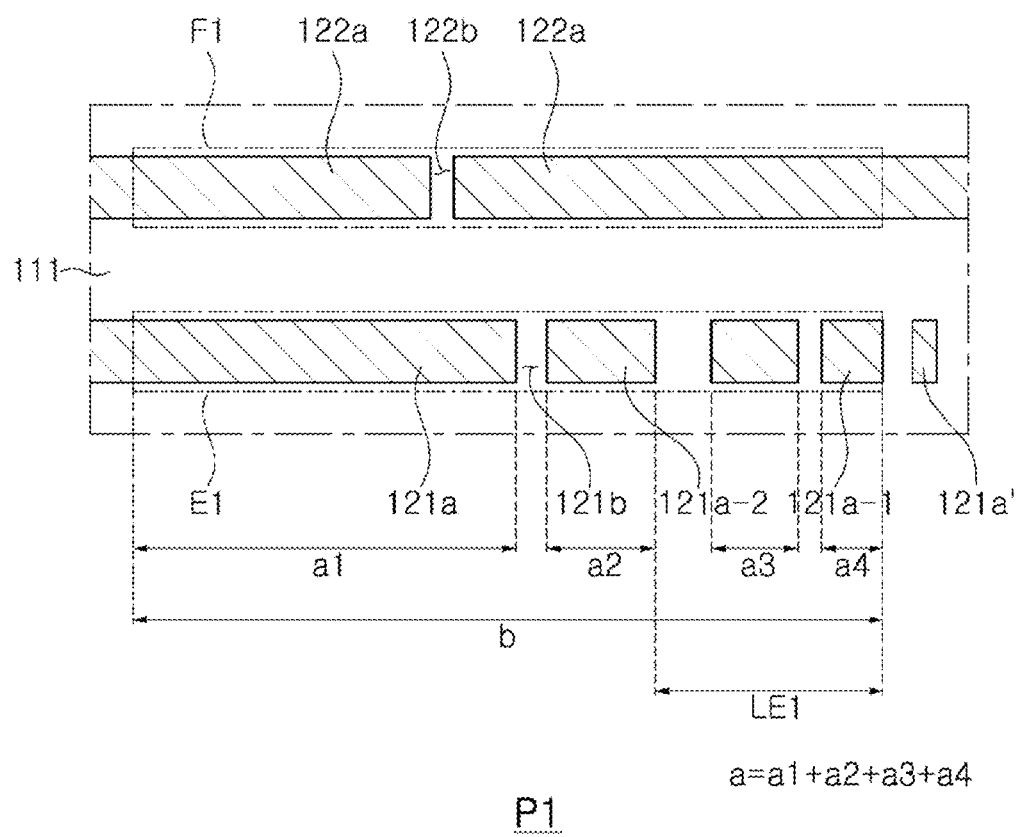
FIG. 5 is an enlarged view of a region P1 of FIG. 2.

FIG. 1 is a perspective view schematically illustrating a multilayer electronic component according to an exemplary embodiment of the present disclosure;

FIG. 2 is a cross-sectional view taken along line I-I' of FIG. 1;

FIG. 3 is a cross-sectional view taken along line II-II' of FIG. 1;

FIG. 4 is an exploded perspective view schematically illustrating an exploded body in which a dielectric layer and an internal electrode of FIG. 1 are stacked on each other;

FIG. 5 is an enlarged view of a region P1 of FIG. 2; and

Figure 6:
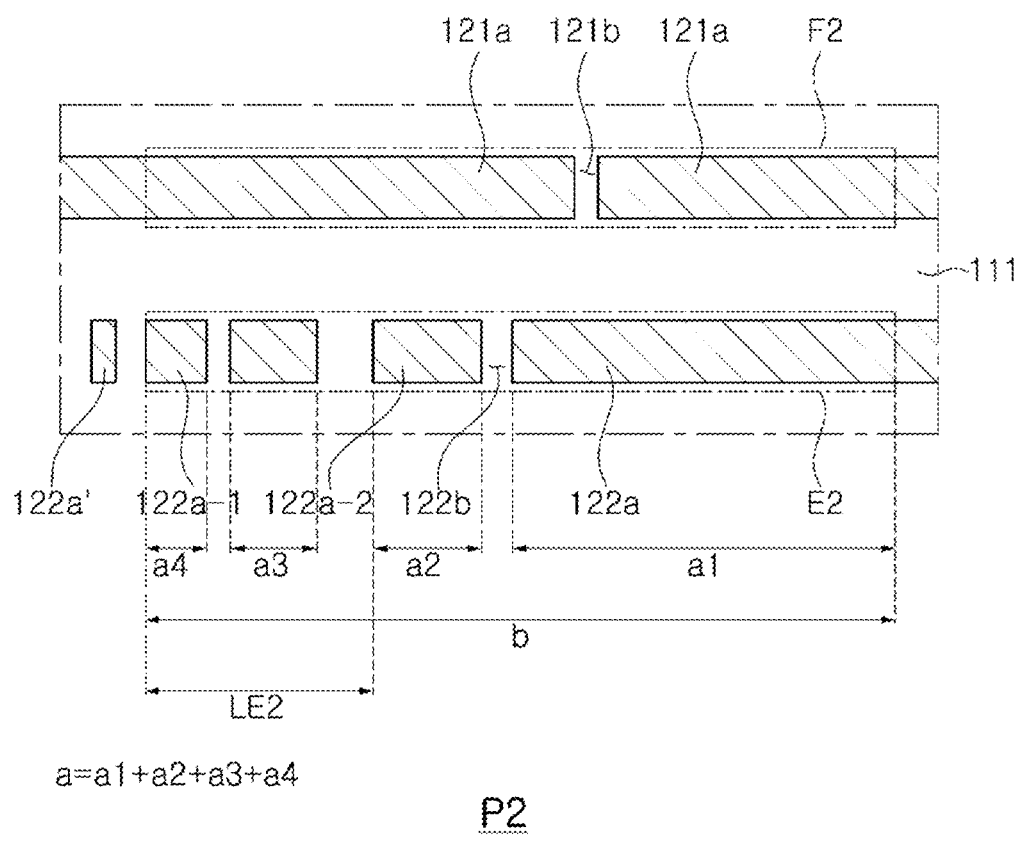
FIG. 6 is an enlarged view of a region P2 of FIG. 2.

FIG. 6 is an enlarged view of a region P2 of FIG. 2.

Hereinafter, a multilayer electronic component 100 according to an exemplary embodiment of the present disclosure is described with reference to FIGS. 1 through 6.

The multilayer electronic component according to an exemplary embodiment of the present disclosure may include: a body 110 including a plurality of dielectric layers 111 and first and second internal electrodes 121 and 122 alternately disposed in a first direction with a dielectric layer interposed therebetween, and including first and second surfaces 1 and 2 opposing each other in the first direction, third and fourth surfaces 3 and 4 connected to the first and second surfaces and opposing each other in a second direction, and fifth and sixth surfaces 5 and 6 connected to the first to fourth surfaces 1 to 4 and opposing each other in a third direction; a first external electrode 131 disposed on the third surface 3 and connected to the first internal electrode 121; and a second external electrode 132 disposed on the fourth surface 4 and connected to the second internal electrode 122, wherein the first internal electrode 121 is spaced apart from the fourth surface 4 and includes a plurality of first conductor portions 121a and first cut-off portions 121b, and the second internal electrode 122 is spaced apart from the third surface 3 and includes a plurality of second conductor portions 122a and second cut-off portions 122b. An average value of connectivity CE1 of an end of the first internal electrode may be 60% or more, when E1 is a region from a first conductor portion 121a-1 which is closest to the second external electrode 132 among the first conductor portions each having thickness and length of 80 nm or more among the plurality of first conductor portions 121a to 10 μm inside the first internal electrode, based on a cross-section of the body in a first-second direction, and the connectivity CE1 of the end of the first internal electrode 121 is a ratio of a length of the first internal electrode, occupied by the plurality of first conductor portions 121a, to a length of E1.

In order for the multilayer electronic component to have a smaller size and higher capacitance, required is technology in which each of the internal electrode and the dielectric layer has a smaller thickness. However, as the internal electrode has the smaller thickness, a problem may occur such as a short circuit between the internal electrodes, reduced capacitance or lower breakdown voltage. In particular, as the internal electrode has the smaller thickness, the internal electrode may have lower smoothness, and an end of the internal electrode may have lower connectivity. Accordingly, the present disclosure intends to control the connectivity of the end of the internal electrode, thereby suppressing the occurrence of the short circuit between the internal electrodes, reduced capacitance or lower breakdown voltage.

Hereinafter, the description specifically describes each component of the multilayer electronic component 100.

The body 110 may include the dielectric layer 111 and the internal electrode 121 or 122, which are alternately stacked on each other.

The body 110 is not limited to a particular shape, and may have a hexahedral shape or a shape similar to the hexahedral shape, as shown in the drawings. The body 110 may not have the shape of a hexahedron having perfectly straight lines because a ceramic powder included in the body 110 is contracted in a process in which the body is sintered. However, the body 110 may have a substantially hexahedral shape.

The body 110 may include the first and second surfaces 1 and 2 opposing each other in the first direction, the third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

The plurality of dielectric layers 111 included in the body 110 may already be sintered, and adjacent dielectric layers 111 may thus be integrated with each other, thus making it difficult to confirm a boundary therebetween without using a scanning electron microscope (SEM).

According to an exemplary embodiment of the present disclosure, a raw material used for forming the dielectric layer 111 is not particularly limited as long as the capacitor obtains sufficient capacitance from the raw material. For example, the dielectric layer may use a material such as a barium titanate-based material, a lead composite perovskite-based material or a strontium titanate-based material. The barium titanate-based material may include the barium titanate ($BaTiO_3$)-based ceramic powder, and this ceramic powder may be, for example, $BaTiO_3$ or $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$) or $Ba(Ti_{1-y}Zr_y)O_3$ ($0<y<1$), in which calcium (Ca), zirconium (Zr) or the like is partially dissolved in $BaTiO_3$.

In addition, the raw material of the dielectric layer 111 may be prepared by adding various ceramic additives, organic solvents, binders, dispersing agents and the like, to a powder such as the barium titanate ($BaTiO_3$) powder, based on an object of the present disclosure.

Meanwhile, an average thickness td of the dielectric layer 111 may not need to be particularly limited. For example, the average thickness td of the dielectric layer 111 may be 0.2 μm or more and 2 μm or less.

However, the multilayer electronic component may generally have lower reliability when the dielectric layer has a small thickness of less than 0.6 μm, in particular, when having a thickness of 0.45 μm or less.

According to an exemplary embodiment of the present disclosure, the end of the internal electrode may have higher connectivity, and the multilayer electronic component may thus secure excellent reliability even when 0.45 μm or less is the average thickness of the dielectric layer 111. Therefore, when 0.45 μm or less is the average thickness of the dielectric layer 111, the multilayer electronic component according to the present disclosure may have more remarkably improved reliability.

The average thickness td of the dielectric layer 111 may indicate the average thickness of the dielectric layer 111 disposed between the first and second internal electrodes 121 and 122.

The average thickness of the dielectric layer 111 may be measured by scanning an image of the cross-section of the body 110 in the length-thickness (L-T) direction by using the scanning electron microscope (SEM) with 10,000× magnification. In more detail, the average value of the dielectric layer may be obtained by measuring a thickness of one dielectric layer at thirty equally spaced points in the length direction in the scanned image. The thirty equally spaced points may be designated in a capacitance formation portion Ac. In addition, it is possible to obtain the more general average thickness of the dielectric layer when measuring its average value by extending a measurement target of the average value to ten dielectric layers.

The body 110 may include the plurality of dielectric layers 111 and the plurality of internal electrodes 121 and 122 opposing each other in the first direction with the dielectric layer 111 interposed therebetween.

The body 110 may include the capacitance formation portion Ac disposed in the body 110 and including the plurality of internal electrodes 121 and 122 opposing each other in the first direction with the dielectric layer 111 interposed therebetween, and cover portions 112 and 113 disposed on both end surfaces of the capacitance formation portion Ac in the first direction.

In addition, the capacitance formation portion Ac may be a portion contributing to capacitance formation of the capacitor, and may be formed by repeatedly stacking the plurality of first and second internal electrodes 121 and 122 having the dielectric layer 111 interposed therebetween. In addition, the capacitance formation portion Ac may indicate a region in which the plurality of internal electrodes 121 and 122 overlap each other. Referring to FIG. 2, the capacitance formation portion Ac may indicate a space from the internal electrode disposed at an uppermost portion in the first direction to the internal electrode disposed at a lowermost portion in the first direction, and may exclude a margin portion in the second direction, i.e. region where only one of the first internal electrode 121 and the second internal electrode 122 is disposed so that the first internal electrode and the second internal electrode do not overlap each other.

The cover portions 112 and 113 may include the upper cover portion 112 disposed on an upper surface of the capacitance formation portion Ac in the first direction and the lower cover portion 113 disposed on a lower surface of the capacitance formation portion Ac in the first direction.

The upper cover portion 112 and the lower cover portion 113 may be formed by stacking one dielectric layer or two or more dielectric layers on the upper and lower surfaces of the capacitance formation portion Ac in the thickness direction, respectively, and may basically serve to prevent damage to the internal electrodes, caused by the physical or chemical stress.

The upper and lower cover portions 112 and 113 may include no internal electrode and may include the same material as the dielectric layer 111.

That is, the upper and lower cover portions 112 and 113 may include a ceramic material such as a barium titanate (BaTiO$_3$)-based ceramic material.

Meanwhile, an average thickness of the cover portion 112 or 113 may not need to be particularly limited. However, 15 μm or less may be the average thickness of the cover portion 112 or 113 in order for the multilayer electronic component to more easily have the smaller size and the higher capacitance. The average thickness of the cover portion 112 or 113 may indicate its size in the first direction, and may have a value obtained by averaging the sizes of the cover portions 112 and 113 in the first direction, which is measured at five equally spaced points on upper and lower portions of the capacitance formation portion Ac.

In addition, margin portions 114 and 115 may each be disposed on a side of the capacitance formation portion Ac.

The margin portions 114 and 115 may include the margin portion 114 disposed on the fifth surface 5 of the body 110 and the margin portion 115 disposed on the sixth surface 6 of the body 110. That is, the margin portions 114 and 115 may be disposed on both sides of the ceramic body 110 in the width direction.

As shown in FIG. 3, the margin portions 114 and 115 may indicate a region between both ends of the first and second internal electrodes 121 and 122 and a boundary surface of the body 110 based on a cross-section of the body 110 cut in a width-thickness (W-T) direction.

The margin portions 114 and 115 may basically serve to prevent the damage to the internal electrode, caused by the physical or chemical stress.

The margin portions 114 and 115 may be formed by forming the internal electrode by applying a conductive paste on a ceramic green sheet except its portion where the margin portion is to be positioned.

Alternatively, in order to suppress a step difference occurring due to the internal electrodes 121 and 122, the margin portions 114 and 115 may be formed by stacking the internal electrodes on each other, then cutting the internal electrodes to be exposed to the fifth and sixth surfaces 5 and 6 of the body, and then stacking one dielectric layer or two or more dielectric layers on the both sides of the capacitance formation portion Ac in the width direction.

The internal electrodes 121 and 122 may be alternately stacked on each other interposing the dielectric layer 111 therebetween.

The internal electrodes 121 and 122 may include the first internal electrode 121 and the second internal electrode 122, which have polarities different from each other, and the first and second internal electrodes 121 and 122 may be alternately disposed in the first direction with the dielectric layer 111 interposed therebetween.

Referring to FIG. 2, the first internal electrode 121 may be spaced apart from the fourth surface 4 of the body 110 and exposed to the third surface 3, and the second internal electrode 122 may be spaced apart from the third surface 3 of the body 110 and exposed to the fourth surface 4. The external electrodes 131 and 132 may respectively be disposed on the third surface 3 and fourth surface 4 of the body 110 to respectively be connected to the internal electrodes 121 and 122.

Here, the first and second internal electrodes 121 and 122 may be electrically insulated from each other by the dielectric layer 111 interposed therebetween.

Referring to FIG. 4, the body 110 may be formed by alternately stacking the ceramic green sheet on which the first internal electrode 121 is printed and the ceramic green sheet on which the second internal electrode 122 is printed on each other and then sintering the same.

The internal electrodes 121 and 122 may be stacked in 400 or more layers to implement the multilayer electronic component having higher capacitance, and is not necessarily limited thereto.

The first internal electrode 121 may be spaced apart from the fourth surface, and include the plurality of first conductor portions 121a and the first cut-off portions 121b, and the second internal electrode 122 may be spaced apart from the third surface 3 and include the plurality of second conductor portions 122a and the second cut-off portions 122b.

The internal electrode and the dielectric layer may have different sintering behaviors during a firing process, and the internal electrodes may thus be agglomerated or cut off. Accordingly, when observing a cross-section of the body, obtained by cutting the internal electrodes 121 and 122 in the thickness direction, the internal electrodes 121 and 122 may include not only the conductor portions 121a and 122a, but also the cut-off portions 121b and 122b disposed between the conductor portions 121a and 122a. The conductor portion 121a or 122b may have any of various sizes. As the cut-off portion 121b or 122b is disposed between the conductor portion 121a or 122a, the plurality of conductor portions 121a or 122a may have lengths different from each other, and the conductor portions 121a or 122a may also have thicknesses different from each other due to the agglomerated internal electrodes, different thicknesses of internal electrode patterns, etc. Here, the length of the conductor portion 121a or 122a may indicate a size of the conductor portion in the second direction, and the thickness of the conductor portion 121a or 122a may indicate a size of the conductor portion in the first direction.

When the internal electrodes 121 and 122 include many cut-off portions 121b and 122b, the multilayer electronic component may have the reduced capacitance and the lower reliability. In particular, there is a higher probability in which such a cut-off portion occurs at the end of the internal electrode than at a central portion of the internal electrode, and this tendency may be increased as the internal electrode has the smaller thickness.

According to an exemplary embodiment of the present disclosure, 60% or more may be the connectivity CE1 of the end of the internal electrode, thereby improving capacitance of the multilayer electronic component per its unit volume and suppressing the occurrence of the short circuit between the internal electrodes or lower breakdown voltage.

Referring to FIGS. 2 and 5, E1 may indicate the region from the first conductor portion 121a-1 which is closest to the second external electrode 132 among the first conductor portions each having the thickness and length of 80 nm or more among the plurality of first conductor portions 121a to 10 μm inside the first internal electrode, based on the cross-section of the body in the first-second direction, and the connectivity CE1 of the end of the first internal electrode may indicate the ratio of a length of the first internal electrode, occupied by the plurality of first conductor portions 121a, to the length of E1. In FIG. 5, "b" is the length of E1, and "a" is a sum of lengths a1, a2, a3 and a4 of the first conductor portions arranged in the region of E1, and the connectivity CE1 of the end of the first internal electrode may thus be calculated as a/b×100 (%). The region of E1 may exclude a first conductor portion 121a' having thickness and length of less than 80 nm and disposed closer to the second external electrode than the first conductor portion 121a-1 closest to the second external electrode 132 among the first conductor portions each having the thickness and length of 80 nm or more.

The reason why the end of the first internal electrode has lower connectivity CE1 may be that the internal electrode pattern has non-uniform thicknesses. Therefore, in order to secure 60% or more as the average value of the connectivity CE1 of the end of the first internal electrode, it may be important for the internal electrode pattern printed on the ceramic green sheet to have a uniform and smooth surface. There is no need to limit a method of forming the surface of the internal electrode pattern uniformly and smoothly. However, in order to manufacture the multilayer electronic component according to an exemplary embodiment of the present disclosure more easily, with shorter manufacturing time and in mass-production, the multilayer electronic component may be manufactured by using a manufacturing method according to another exemplary embodiment of the present disclosure, to be described below.

Here, the cross-section of the body in the first-second direction may indicate the cross-section of the body, cut in the first-second direction from a center of the body in the third direction.

In addition, the average value of the connectivity of the end of the first internal electrode may be a value obtained by measuring values of five to seven first internal electrodes arranged in a center of a region, in which the body is divided into thirds in the first direction, based on the cross-section of the body in the first-second direction and then averaging the same.

In an exemplary embodiment, it is possible to improve the capacitance and reliability per unit volume of the multilayer electronic component by securing 84 or more as an average value of E1s/F1s×100 when F1 is a region of the second internal electrode, opposing E1 in the first direction, E1s is an area of the first conductor portion 121a included in E1, and F1s is an area of the second conductor portion 122a included in F1.

An upper limit of the average value of E1s/F1s×100 may not need to be particularly limited, and as the value approaches 100, it is possible to maximize the capacitance and reliability per unit volume of the multilayer electronic component.

Here, the average value of E1s/F1s×100 may be a value obtained by measuring values of five to seven pairs of first and second internal electrodes arranged in the center of the region, in which the body is divided into thirds in the first direction, based on the cross-section of the body in the first-second direction, and then averaging the same.

In an exemplary embodiment, 4.2 μm or less may be an average value of a length LE1 of the end of the first internal electrode when the length LE1 of the end of the first internal electrode is a length of the first internal electrode from the first conductor portion 121a-1 closest to the second external electrode among the first conductor portions each having the thickness and length of 80 nm or more among the plurality of first conductor portions 121a to the first conductor portion 121a-2 closest to the second external electrode among the first conductor portions each having a length equal to or greater than twice its thickness among the plurality of first conductor portions 121a. The shorter the length LE1 of the end of the first internal electrode, the more advantageous it is to secure the capacitance and reliability per unit volume of the multilayer electronic component. Accordingly, a lower limit of the length LE1 may not need to be particularly limited, and as the value approaches zero, it is possible to maximize the capacitance and reliability per unit volume of the multilayer electronic component.

Here, the average value of the length of the end of the first internal electrode may be a value obtained by measuring values of five to seven first internal electrodes arranged in the center of the region, in which the body is divided into thirds in the first direction, based on the cross-section of the body in the first-second direction, and then averaging the same.

Figure 7:
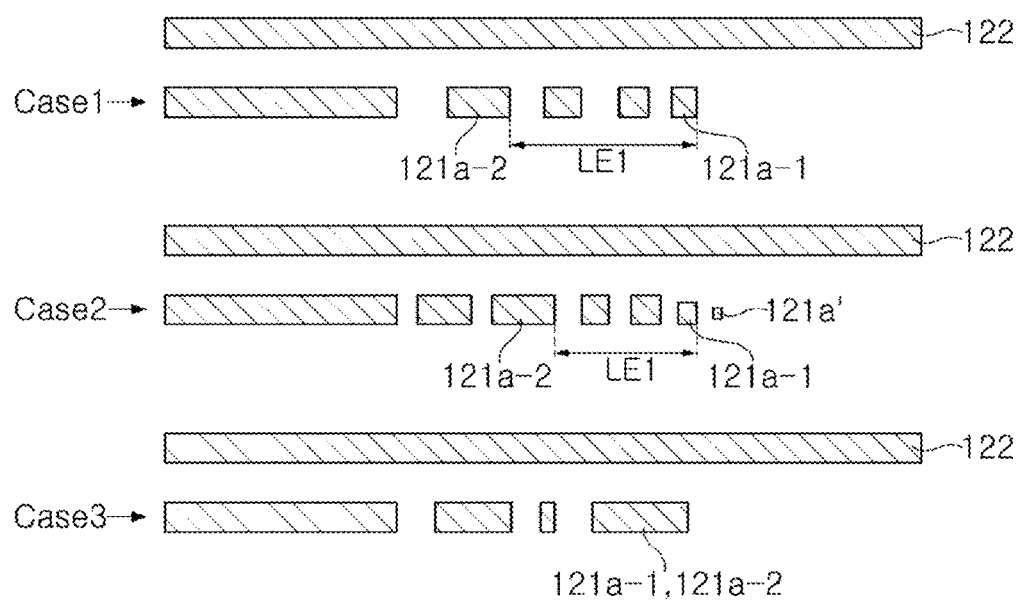
FIG. 7 is a schematic view for explaining a length of an end of the internal electrode.

Referring to FIG. 7 which is a schematic view for explaining the length LE1 of the end of the first internal electrode, Case 1 is a case where 80 nm or more is the thickness and length of the first conductor portion 121a-1 closest to the second external electrode 132. Here, the length LE1 of the end of the first internal electrode may indicate a distance from the first conductor portion 121a-1 closest to the second external electrode 132 as a start point to the first conductor portion 121a-2 having the length equal to or greater than twice its thickness.

Case 2 of FIG. 7 is a case where less than 80 nm is the thickness and length of the first conductor portion 121a' closest to the second external electrode 132. Here, the length LE1 of the end of the first internal electrode may indicate the distance from the first conductor portion 121a-1 closest to the second external electrode 132 as the start point, among the first conductor portions each having the thickness and length of 80 nm or more, to the first conductor portion 121a-2 having the length equal to or greater than twice its thickness, by excluding, from the measurement, the first conductor portion 121a' closest to the second external electrode 132 and having the thickness and length less than 80 nm.

Case 3 of FIG. 7 is a case where the first conductor portion 121a-1 or 121a-2 closest to the second external electrode 132 has the thickness and length of 80 nm or more, and the length equal to or greater than twice its thickness. Here, the length LE1 of the end of the first internal electrode may be zero (0) μm because the start and end points of the length LE1 of the end of the first internal electrode are the same as each other.

Hereinafter, the description describes a specific example of measuring the connectivity CE1 of the end of the first internal electrode, E1s/F1s×100 and the length LE1 of the end of the first internal electrode.

First, the multilayer electronic component 100 may be polished in the third direction to expose the cross-section of the body in the first-second direction. In this case, the polishing may be performed up to the center of the body in the third direction when measuring the connectivity CE1 of the end of the first internal electrode, E1s/F1s×100 and the length LE1 of the end of the first internal electrode, based on only the cross-section of the body in the first-second direction.

The average value of the connectivity CE1 of the end of the first internal electrode and the average value of the length LE1 of the end of the first internal electrode may be obtained by obtaining an image (having a width of 27.64 μm and a length of 19.18 μm) by observing end portions of the internal electrodes arranged in the center of the region, in which the body is divided into thirds in the first direction, based on the cross-section of the body in the first-second direction, by using a tool microscope with 10,000× magnification, and then analyzing five to seven first internal electrodes in the image. In addition, the average value of E1s/F1s×100 may be obtained by analyzing five to seven pairs of first and second internal electrodes in the image.

Meanwhile, the average value of CE1, the average value of E1s/F1s×100, and the average value of LE1 may respectively be obtained in the three cross-sections of the body in the first-second direction, and then the values may be averaged to obtain more general values of the average value of CE1, the average value of E1s/F1s×100 and the average value of LE1. In this case, the three cross-sections of the body in the first-second direction obtained at each point may be observed by sequentially polishing the multilayer electronic component 100 to ⅓, ½ and ⅔ points of the body in the third direction.

Table 1 below shows an evaluation of a ratio of the breakdown voltage (BDV) based on a change in the average value of CE1.

The ratio of the breakdown voltage (BDV) shown in Table 1 is obtained by preparing 100 sample chips for each test number, and then setting a voltage at which a short circuit occurs in the sample chip to the BDV to obtain each average value of the BDV for the 100 samples. The average value of the BDV in Test No. 1 is used as a reference value (100%), and each ratio of the average values of the BDV of Test Nos. 2 to 7 is described as a BDV ratio.

TABLE 1

| Test No. | Average value (%) of CE1 | Average value of E1s/F1s × 100 | Average value (μm) of LE1 | BDV Ratio |
| --- | --- | --- | --- | --- |
| 1 | 93 | 95 | 0.3 | 100% |
| 2 | 91 | 94.1 | 0.6 | 98% |
| 3 | 86.3 | 90.7 | 1.2 | 96% |
| 4 | 75 | 89 | 2.4 | 92% |
| 5 | 60.0 | 84 | 4.2 | 86% |
| 6 | 51.6 | 37.0 | 6.9 | 71% |
| 7 | 45 | 35.3 | 8.4 | 65% |

It may be confirmed that Test Nos. 1 to 5 in which the average value of CE1 is 60.0% or more each have a good BDV ratio.

On the other hand, it may be confirmed that Test Nos. 6 and 7 in which the average value of CE1 is less than 60.0% each have a poor BDV ratio.

Figure 8:
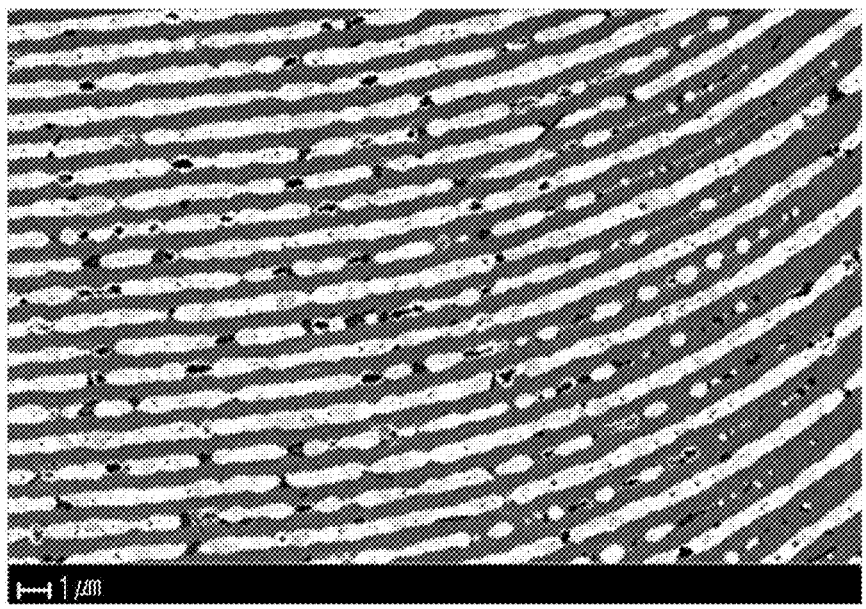
FIG. 8 is an image obtained by observing an end portion of a first internal electrode of Test No. 3, based on a cross-section of a body of the multilayer electronic component in a first-second direction, by using a tool microscope with 10,000× magnification
Figure 9:
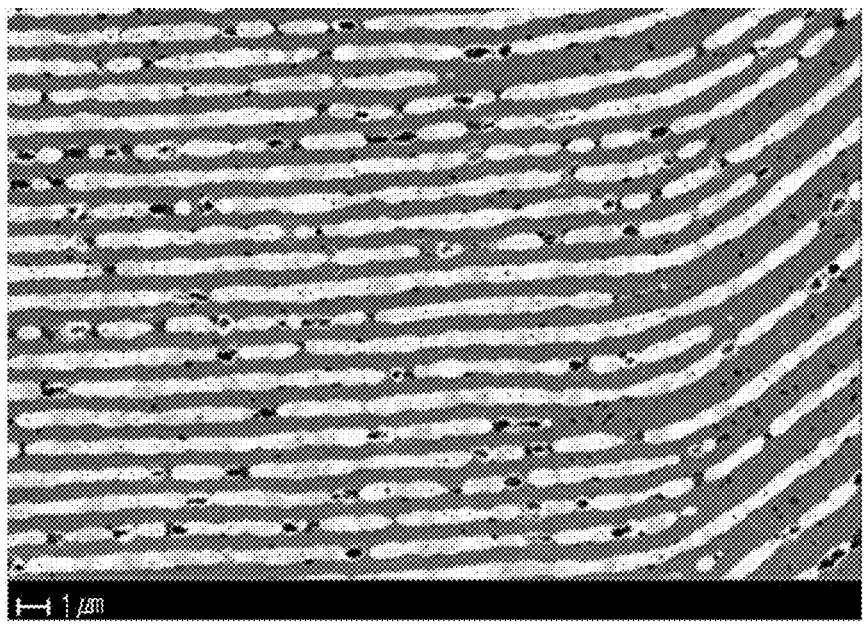
FIG. 9 is an image obtained by observing an end portion of a first internal electrode of Test No. 10, based on the cross-section of the body in the first-second direction, by using the tool microscope with 10,000× magnification.

FIG. 8 is an image (having the width of 27.64 μm and the length of 19.18 μm) obtained by observing an end portion of a first internal electrode of Test No. 2, based on the cross-section of the body in the first-second direction, by using the tool microscope with 10,000× magnification; and FIG. 9 is an image (having the width of 27.64 μm and the length of 19.18 μm) obtained by observing an end portion of a first internal electrode of Test No. 6, based on the cross-section of the body in the first-second direction, by using the tool microscope with 10,000× magnification. Test No. 2 shows a case where the internal electrode pattern is printed using a reverse offset printing according to the present disclosure to be described below, and Test No. 6 shows a case where the internal electrode pattern is printed using a gravure printing method.

Even without referring to the specific measurement values shown in Table 1, it may be seen from the images of FIGS. 8 and 9 that the end of the first internal electrode of Test No. 2 has significantly higher connectivity CE1 than Test No. 6.

Figure 14:
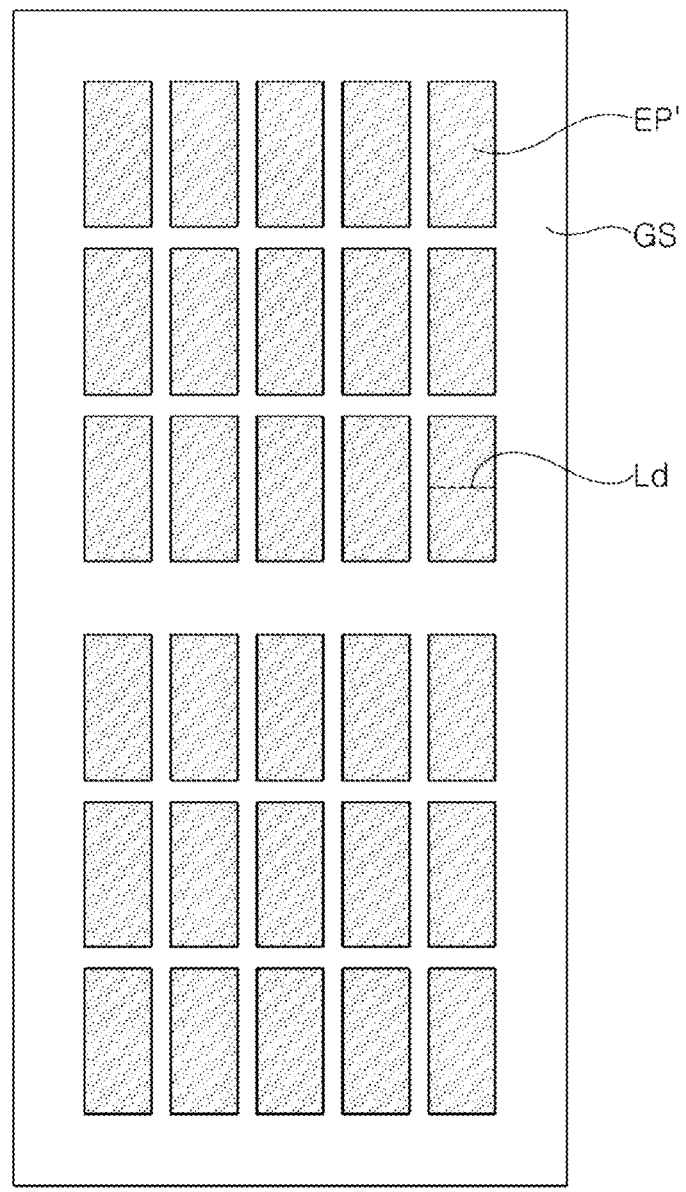
FIG. 14 shows a ceramic green sheet on which an internal electrode pattern is printed.
Figure 15:
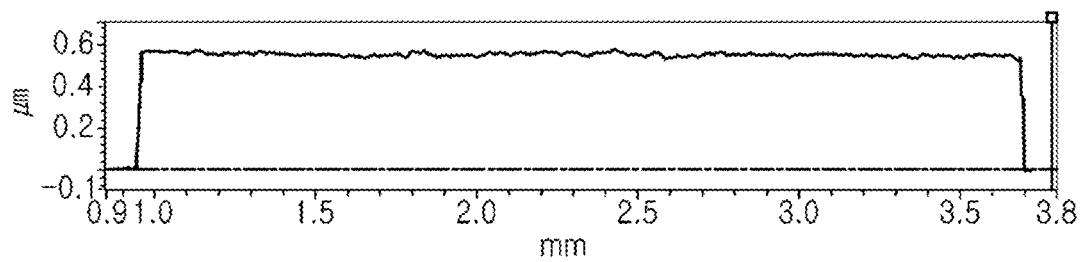
FIG. 15 is a graph showing a thickness of the internal electrode pattern measured along a dotted line of FIG. 14 when the internal electrode pattern is printed using the manufacturing method of the present disclosure.

In addition, FIG. 14 is a top view of a ceramic green sheet GS on which an internal electrode pattern EP' is printed and FIG. 15 is a graph showing a thickness of the internal electrode pattern measured along a dotted line Ld of FIG. 14 when the internal electrode pattern EP' is printed using the manufacturing method of the present disclosure. Referring to FIGS. 14 and 15, it may be confirmed that the internal electrode pattern EP' has a very uniform thickness in which 0.1 μm or less is a difference between a maximum thickness and a minimum thickness.

Figure 16:
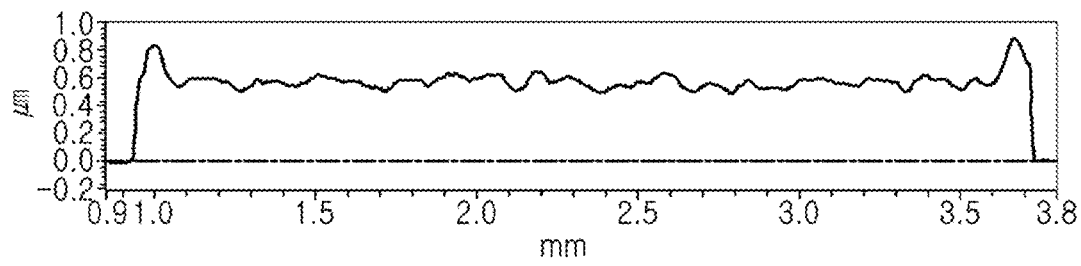
FIG. 16 is a graph showing the thickness of the internal electrode pattern measured along the dotted line of FIG. 14 when the internal electrode pattern is printed using a gravure printing method.

On the other hand, FIG. 16 is a graph showing the thickness of the internal electrode pattern measured along the dotted line Ld of FIG. 14 when the internal electrode pattern is printed using the gravure printing method. Referring to FIG. 16, it may be confirmed that a saddle phenomenon occurs in which the end portion of the internal electrode pattern has a greater thickness than its central portion, and the internal electrode pattern has a non-uniform thickness in which 0.2 μm or more is the difference between the maximum thickness and the minimum thickness.

It may thus be confirmed that in order to secure high connectivity CE1 of the end of the first internal electrode, it is important for the internal electrode pattern printed on the ceramic green sheet to have the uniform and smooth surface.

Meanwhile, not only the first internal electrode 121 but also the second internal electrode 122 may satisfy the above-mentioned conditions.

Referring to FIG. 6, 60% or more is an average value of connectivity CE2 of an end of the second internal electrode when E2 is a region from the second conductor portion 122a-1 which is closest to the first external electrode among the second conductor portions each having thickness and length of 80 nm or more among the plurality of second conductor portions 122a to 10 μm inside the second internal electrode, and the connectivity CE2 of the end of the second internal electrode is a ratio of a length of the second internal electrode, occupied by the plurality of second conductor portions, to a length of E2.

In addition, 84 or more may be an average value of E2s/F2s×100 when F2 is a region of the first internal electrode, opposing E2 in the first direction, E2s is an area of the second conductor portion included in E2, and F2s is an area of the second conductor portion included in F2.

In addition, 4.2 μm or less may be an average value of a length LE2 of the end of the second internal electrode when the length LE2 of the end of the second internal electrode is a length of the second internal electrode from the second conductor portion 122a-1 closest to the first external electrode and having the thickness and length of 80 nm or more among the plurality of second conductor portions 122a to the second conductor portion 122a-2 closest to the first external electrode and having a length equal to or greater than twice its thickness.

In an exemplary embodiment, 80% or more may be an average value of connectivity of the first internal electrode when the connectivity of the first internal electrode is a ratio of a length of the first internal electrode, occupied by the first conductor portion 121a, to the length of the first internal electrode 121. The multilayer electronic component may have the lower reliability and the reduced capacitance when the connectivity of the first internal electrode is less than 80%.

In general, there is a higher probability in which such a cut-off portion occurs at the end of the internal electrode than at the central portion of the internal electrode. The connectivity of the first internal electrode may thus be secured to 80% or more when the connectivity CE1 of the end of the first internal electrode is secured to 60% or more according to an exemplary embodiment of the present disclosure.

In addition, 80% or more may be the average value of the connectivity of the second internal electrode when the connectivity of the second internal electrode is the ratio of a length of the second internal electrode, occupied by the second conductor portion 122a, to the length of the second internal electrode 122.

The average value of the connectivity of the first internal electrode and the average value of the connectivity of the second internal electrode may be obtained by observing and measuring values of any four regions of the capacitance formation portions Ac by using the tool microscope with 10,000× magnification, based on the cross-section of the multilayer electronic component 100 in the first-second direction, and then averaging the values.

In an exemplary embodiment, the first or second cut-off portion 121b or 122b may include at least one of a pore and a dielectric. Referring to FIG. 8, it may be determined that the pore is a portion observed in black among the cut-off portions of the internal electrode, and the dielectric is a portion observed in the same color as the dielectric layer. The dielectric disposed in the cut-off portion may serve as a bridge connecting the dielectric layers to each other.

A material used for forming the internal electrode 121 or 122 is not particularly limited, and may be a material having excellent electrical conductivity. For example, the internal electrode 121 or 122 may include at least one of nickel (Ni), copper (Cu), palladium (Pd), silver (Ag), gold (Au), platinum (Pt), tin (Sn), tungsten (W), titanium (Ti) and an alloy thereof.

In addition, the internal electrodes 121 and 122 may be formed by printing, on the ceramic green sheet, a conductive paste for internal electrodes including at least one of nickel (Ni), copper (Cu), palladium (Pd), silver (Ag), gold (Au), platinum (Pt), tin (Sn), tungsten (W), titanium (Ti) and an alloy thereof. A method of printing the conductive paste for the internal electrodes may be a screen printing method, the gravure printing method or the like, and the present disclosure is not limited thereto.

In addition, an average thickness te of the internal electrode 121 or 122 may not need to be particularly limited.

For example, the average thickness te of the internal electrode 121 or 122 may be 0.2 µm or more and 2 µm or less.

However, the multilayer electronic component may generally have the lower reliability when the internal electrode has a small thickness of less than 0.6 µm, in particular, when having a thickness of 0.4 µm or less.

According to an exemplary embodiment of the present disclosure, the end of the internal electrode may have the higher connectivity, and the multilayer electronic component may thus secure the excellent reliability even when 0.4 µm or less is the average thickness of the internal electrode 121 or 122.

Therefore, when 0.4 µm or less is the average thickness of the internal electrode 121 or 122, the multilayer electronic component according to the present disclosure may have the more remarkably improved reliability, and may thus more easily have the smaller size and the higher capacitance. Accordingly, 0.4 µm or less or 0.35 µm or less may be the average thickness te of the internal electrode 121 or 122.

The average thickness te of the internal electrode 121 or 122 may indicate the average thickness of the internal electrode 121 or 122.

The average thickness of the internal electrode 121 or 122 may be measured by scanning an image of the cross-section of the body 110 in the length-thickness (L-T) direction by using the scanning electron microscope (SEM) with 10,000× magnification. In more detail, the average value of the internal electrode may be obtained by measuring a thickness of one internal electrode at thirty equally spaced points in the length direction in the scanned image. The thirty equally spaced points may be designated in the capacitance formation portion Ac. In addition, it is possible to obtain the more general average thickness of the internal electrode when measuring its average value by extending a measurement target of the average value to ten internal electrodes.

The external electrodes 131 and 132 may respectively be disposed on the third surface 3 and fourth surface 4 of the body 110.

The external electrodes 131 and 132 may respectively disposed on the third and fourth surfaces 3 and 4 of the body 110, and may include the first and second external electrodes 131 and 132 respectively connected to first and second internal electrodes 121 and 122.

This exemplary embodiment describes that the multilayer electronic component 100 includes two external electrodes 131 and 132. However, the number, shape or the like of the external electrode 131 or 132 may depend on a shape of the internal electrode 121 or 122 or another purpose.

Meanwhile, the external electrode 131 or 132 may be made of any material having electrical conductivity, such as a metal, may use a specific material determined in consideration of electrical characteristics, structural stability or the like, and may have a multilayer structure.

For example, the external electrodes 131 and 132 may each include electrode layers 131a and 132a disposed on the body 110 and plating layers 131b and 132b respectively formed on the electrode layers 131a and 132a.

As a more specific example of the electrode layer 131a or 132a, the electrode layer 131a or 132a may be a fired electrode including a conductive metal and glass, or a resin-based electrode including the conductive metal and a resin.

In addition, the electrode layer 131a or 132a may have a shape in which the fired electrode and the resin-based electrode are sequentially formed on the body. In addition, the electrode layer 131a or 132a may be formed by transferring a sheet including the conductive metal to the body or by transferring the sheet including the conductive metal to the fired electrode.

The electrode layer 131a or 132a may also be formed using an atomic layer deposition (ALD) method, a molecular layer deposition (MLD) method, a chemical vapor deposition (CVD) method, a sputtering method, etc.

The conductive metal used for the electrode layer 131a or 132a is not particularly limited as long as the conductive metal is the material which may be electrically connected to the internal electrode to form the capacitance. For example, the conductive metal may include at least one selected from the group consisting of nickel (Ni), copper (Cu), palladium (Pd), silver (Ag), gold (Au), platinum (Pt), tin (Sn), tungsten (W), titanium (Ti) and an alloy thereof.

The plating layer 131b or 132b may serve to improve a mount characteristic of the multilayer electronic component. The plating layer 131b or 132b is not limited to a particular type, may include at least one of nickel (Ni), tin (Sn), palladium (Pd) and an alloy thereof, or may include a plurality of layers.

As a more specific example of the plating layer 131b or 132b, the plating layer 131b or 132b may include a nickel (Ni) plating layer or a tin (Sn) plating layer, may include the Ni plating layer and the Sn plating layer sequentially formed on the electrode layer 131a or 132a, or may include the Sn plating layer, the Ni plating layer and the Sn plating layer sequentially formed on the electrode layer 131a or 132a.

Alternatively, the plating layer 131b or 132b may include the plurality of Ni plating layers and/or the plurality of Sn plating layers.

The multilayer electronic component 100 may not need to be limited to a particular size.

However, in order for the multilayer electronic component to have the smaller size and simultaneously have the higher capacitance, it is necessary to increase the number of stacks by allowing the dielectric layer and the internal electrode to each have a smaller thickness. The multilayer electronic component 100 having a size of 0603 (i.e. length× width of 0.6 mm×0.3 mm) or less may thus have more remarkably improved reliability and breakdown voltage according to the present disclosure.

Therefore, in consideration of a manufacturing error, a size of the external electrode and the like, when having a length of 0.66 mm or less and a width of 0.33 mm or less, the multilayer electronic component 100 may have the more remarkably improved reliability according to the present disclosure. Here, the length of the multilayer electronic component 100 may indicate a maximum size of the multilayer electronic component 100 in the second direction, and the width of the multilayer electronic component 100 may indicate a maximum size of the multilayer electronic component 100 in the third direction.

Manufacturing Method of Multilayer Electronic Component

The description describes a manufacturing method in which the multilayer electronic component according to an exemplary embodiment of the present disclosure is more easily manufactured with shorter manufacturing time and in mass production.

However, it needs to be noted that the manufacturing method of the multilayer electronic component according to an exemplary embodiment of the present disclosure described above is not limited to the manufacturing method described below.

Figure 10:
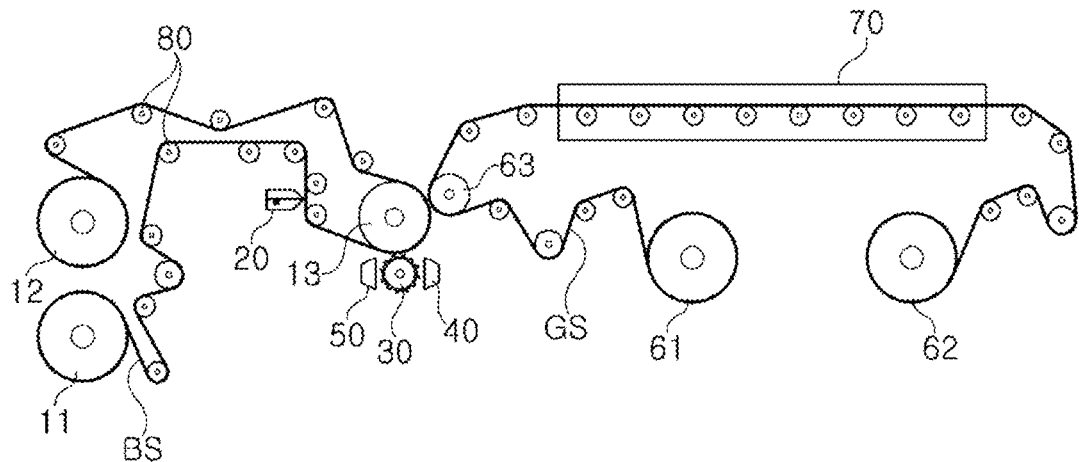
FIG. 10 is a view schematically illustrating a manufacturing method of a multilayer electronic component according to another exemplary embodiment of the present disclosure.
Figure 11:
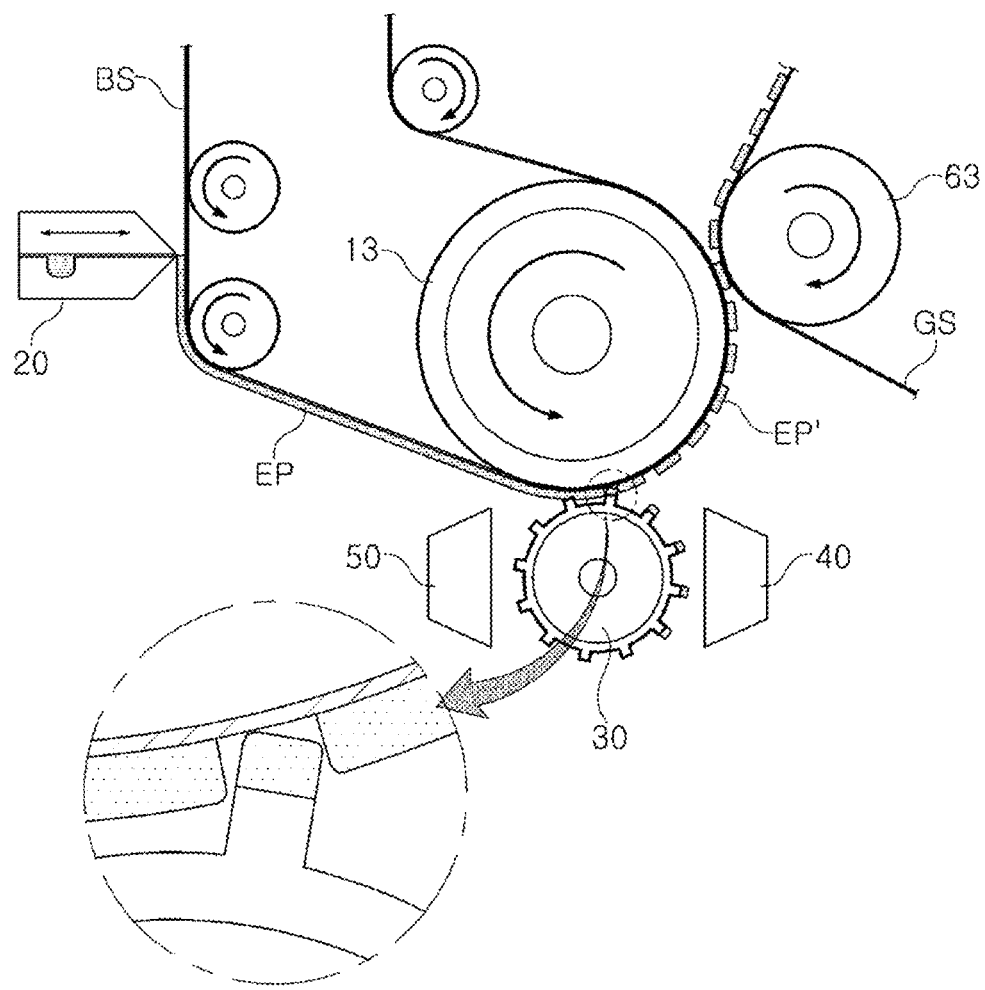
FIG. 11 is an enlarged view of a portion of FIG. 10.
Figure 12:
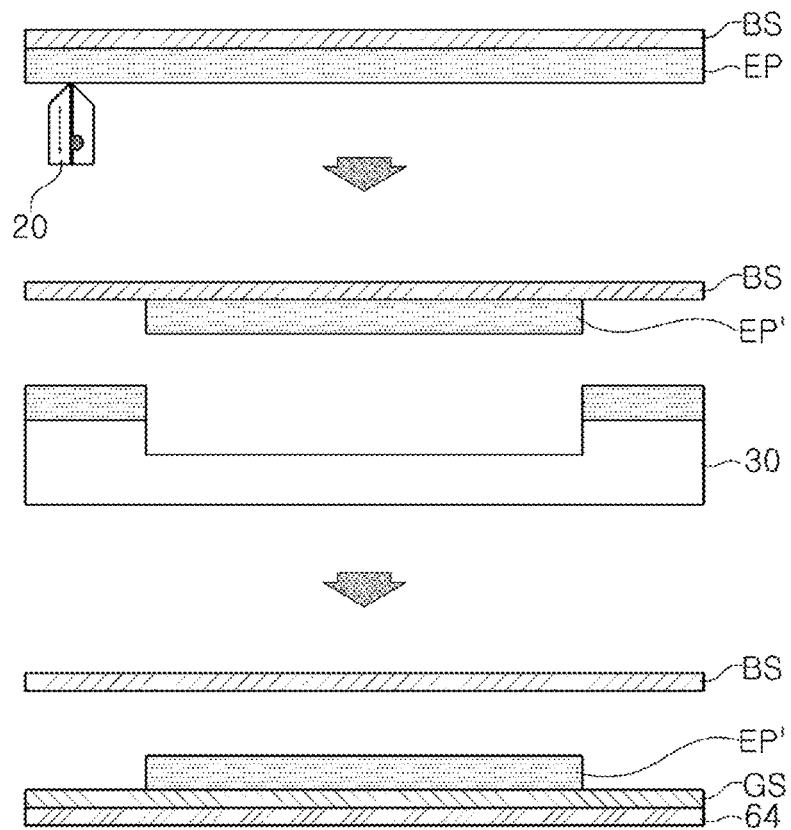
FIG. 12 is a schematic view for explaining a reverse off-set printing.

FIG. 10 is a view schematically illustrating the manufacturing method of a multilayer electronic component according to another exemplary embodiment of the present disclosure;

FIG. 11 is an enlarged view of a portion of FIG. 10;

FIG. 12 is a schematic view for explaining a reverse off-set printing; and

Figure 13:
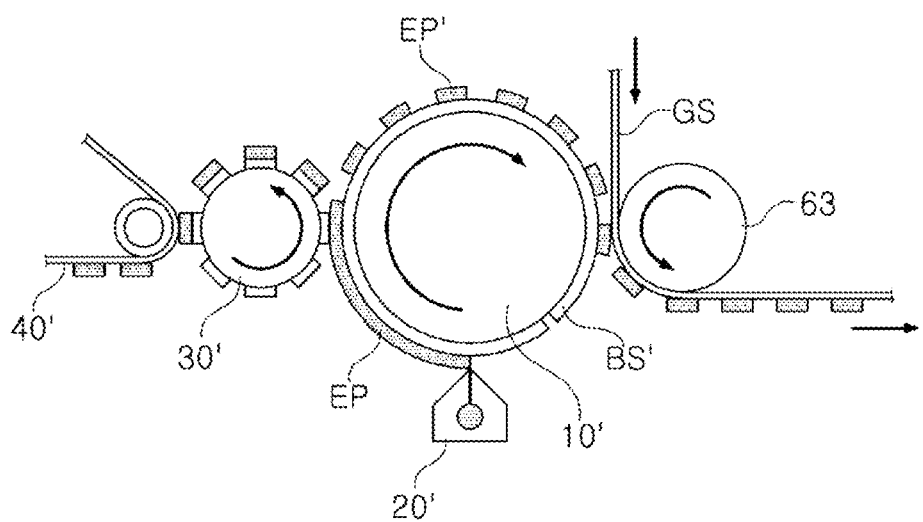
FIG. 13 is a schematic view for explaining a conventional reverse off-set printing.

FIG. 13 is a schematic view for explaining a conventional reverse off-set printing.

The manufacturing method of a multilayer electronic component according to another exemplary embodiment of the present disclosure is described with reference to FIGS. 10 through 13.

The manufacturing method of a multilayer electronic component according to another exemplary embodiment of the present disclosure may include: applying a paste EP for an internal electrode to a continuously supplied blanket sheet BS; forming an internal electrode pattern EP' by removing a portion of the paste for an internal electrode, applied to the sheet; transferring the internal electrode pattern EP' to a continuously supplied ceramic green sheet GS to print the internal electrode pattern EP' on the ceramic green sheet; forming a stack body by stacking the ceramic green sheets GS on each of which the internal electrode pattern EP' is printed; cutting the stack body to obtain a unit stack body; sintering the unit stack body to obtain a sintered body; and forming an external electrode on the body to obtain the multilayer electronic component.

A method of printing the internal electrode pattern on the ceramic green sheet may include a gravure printing, a screen printing, a reverse offset printing, etc.

FIG. 12 is the schematic view for explaining the reverse off-set printing. Referring to FIG. 12, in the reverse offset printing, the paste EP for an internal electrode may be applied to an entire surface of the blanket sheet BS. The internal electrode pattern EP may then be formed by removing a portion of the paste EP for an internal electrode, applied to the sheet, by using a cliché roll 30. The internal electrode pattern EP' may then be transferred to the ceramic green sheet GS to print the internal electrode pattern EP' on the ceramic green sheet.

Unlike the gravure printing and the screen printing, the reverse offset printing may apply the paste EP for an internal electrode on the entire surface of the blanket sheet BS rather than use a design having a mesh mask or a halftone dot, thus making the paste be applied uniformly and smoothly.

However, referring to FIG. 13, which is the schematic view for explaining the conventional reverse off-set printing, the conventional reverse offset printing may be a method in which a blanket sheet BS' is wrapped in a circular blanket roll 10', the paste EP for an internal electrode is doped on a surface of the blanket sheet BS', the internal electrode pattern EP' is then formed by using a cliché roll 30', and the internal electrode pattern EP' on the surface of the blanket sheet BS' is then transferred to the ceramic green sheet GS, and the conventional reverse offset printing may use an intermittent printing rather than a continuous printing.

The conventional reverse offset printing may be suitable for a low-speed printing and may not be suitable for a high-speed printing, thus making the multilayer electronic component have longer manufacturing time and lower productivity.

In addition, the conventional reverse offset printing may be a method in which the blanket sheet BS' wrapped in the circular blanket roll 10' is repeatedly reused. A characteristic of the surface of the blanket sheet BS' may thus be changed, and therefore, a condition of the surface of the blanket sheet BS' may not be constant, thus making the internal electrode pattern EP' have lower uniformity and smoothness. In detail, there may be a continuously increased probability in which a foreign material occurs on the surface of the repeatedly reused blanket sheet BS' and the paste EP for an internal electrode remains on the same surface, thus making the internal electrode pattern EP' have lower uniformity and smoothness. In addition, the blanket sheet may absorb a solvent of the paste EP for an internal electrode, and may thus serve to transfer the paste EP for an internal electrode in a dry state. However, this effect may be gradually reduced as the blanket sheet is repeatedly reused.

On the other hand, according to the manufacturing method according to another exemplary embodiment of the present disclosure, the sheet BS may be continuously supplied. It is thus possible to solve the problem of the conventional reverse offset printing described above because the sheet BS is not reused. That is, according to the manufacturing method according to another exemplary embodiment of the present disclosure, the high-speed printing is possible, and the surface characteristic of the sheet BS may be constantly maintained, thus making the internal electrode pattern have improved uniformity and smoothness. In addition, the blanket sheet BS may absorb the solvent of the paste EP for an internal electrode, and may thus serve to transfer the paste EP for an internal electrode in a dry state, which may minimize fluidity of the paste EP for an internal electrode without a separate dry process, thus making the internal electrode pattern EP have the improved uniformity and smoothness.

Hereinafter, the description describes each process of the manufacturing method according to another exemplary embodiment of the present disclosure.

The Applying of the Paste for an Internal Electrode

The paste EP for an internal electrode may be applied to the continuously supplied sheet BS. According to the present disclosure, the sheet BS may be continuously supplied, the high-speed printing is thus possible, and the characteristic of the surface of the sheet BS may be kept constant, thereby making the internal electrode pattern EP' have improved uniformity and smoothness. In addition, the sheet BS may absorb the solvent of the paste EP for an internal electrode, and may thus serve to transfer the paste EP for an internal electrode in a dry state, which may minimize the fluidity of the paste EP for an internal electrode without a separate dry process, thus making the internal electrode pattern EP' have the improved uniformity and smoothness.

The method of continuously supplying the sheet BS may not need to be particularly limited. In another exemplary embodiment, the sheet BS may be continuously supplied by being moved from a roll 11 on which the sheet is wound to a roll 12 rewinding the sheet. The sheet BS may be stably supplied because a transfer roll 80 is disposed in an intermediate region in which the sheet BS is moved from the roll 11 on which the sheet BS is wound to the roll 12 rewinding the sheet BS.

Here, the sheet BS may be the blanket sheet. The blanket sheet may not need to be limited to a particular type, and may use a conventional blanket sheet of a generally used material.

A method of applying the paste EP for an internal electrode may not be particularly limited. For example, the paste EP for an internal electrode may be applied using a die coater 20. The die coater 20 may be applied to the sheet through the slit, and adjust a thickness of the paste EP for an internal electrode, applied to the sheet BS by adjusting a distance between the die coater 20 and the sheet BS.

The Forming of the Internal Electrode Pattern

The internal electrode pattern EP' may then be formed by removing a portion of the paste for an internal electrode, applied to the sheet BS.

Here, the internal electrode pattern EP' may be formed by removing a portion of the paste for an internal electrode, applied to the sheet, by using the cliché roll 30.

The cliché roll 30 may have a concave portion corresponding to the internal electrode pattern EP' and a convex portion corresponding to the portion to be removed.

The blanket sheet BS to which the paste EP for an internal electrode is applied may pass between the cliché roll 30 and the blanket roll 10, and the cliché roll 30 may be rotated in a direction opposite to a direction in which the blanket roll 10 is rotated in order to apply pressure on the paste, thereby attaching a portion of the paste EP for an internal electrode to the convex portion of the cliché roll 30 and then removing the same to form the internal electrode pattern EP'.

A cleaning member 40 and a drying member 50 may be disposed on both sides of the cliché roll 30. The cleaning member 40 may remove the paste for an internal electrode, attached to the convex portion of the cliché roll 30, and the drying member 50 may dry the cliché roll washed by the cleaning member 40.

The Printing of the Internal Electrode Pattern

The internal electrode pattern EP' may then be transferred to the continuously supplied ceramic green sheet GS to print the internal electrode pattern EP' on the ceramic green sheet GS.

The ceramic green sheet GS may be continuously supplied by being moved from a roll 61 on which the ceramic green sheet GS is wound to a roll 62 rewinding the ceramic green sheet GS. The ceramic green sheet GS may be stably supplied because the transfer roll is disposed in an intermediate region in which the ceramic green sheet is moved from the roll 61 on which the ceramic green sheet is wound to the roll 62 rewinding the ceramic green sheet. The ceramic green sheet GS may be disposed on a base film 64.

The sheet BS on which the internal electrode pattern EP' is disposed may pass between a blanket roll 13 and a pressure roll 63, and the pressure roll 63 may be rotated in a direction opposite to a direction in which the blanket roll 10 is rotated in order to apply pressure on the paste, thereby transferring the internal electrode pattern EP' to the ceramic green sheet GS.

The ceramic green sheet GS on which the internal electrode pattern EP' is printed may then be dried by passing through a dry device 70.

In another exemplary embodiment, the internal electrode pattern EP' may have a thickness deviation of 0.1 μm or less. The internal electrode pattern EP' may have the thickness deviation of 0.1 μm or less, thereby forming the internal electrode having excellent smoothness, and suppressing a step difference in the capacitance formation portion.

FIG. 14 is the top view of the ceramic green sheet GS on which the internal electrode pattern EP' is printed, and FIG. 15 is the graph showing a thickness of the internal electrode pattern measured along the dotted line Ld of FIG. 14 when the internal electrode pattern EP' is printed using the manufacturing method according to the present disclosure. Referring to FIGS. 14 and 15, it may be confirmed that the internal electrode pattern EP' has a very uniform thickness in which 0.1 μm or less is a difference between a maximum thickness and a minimum thickness.

On the other hand, FIG. 16 is the graph showing the thickness of the internal electrode pattern measured along the dotted line Ld of FIG. 14 when the internal electrode pattern is printed using the gravure printing method. Referring to FIG. 16, it may be confirmed that a saddle phenomenon occurs in which the end portion of the internal electrode pattern has a greater thickness than its central portion, and the internal electrode pattern has a non-uniform thickness in which 0.2 μm or more is the difference between the maximum thickness and the minimum thickness.

An average thickness of the internal electrode pattern EP' may not need to be particularly limited, and may be determined in consideration of a thickness of the internal electrode to be obtained.

However, the multilayer electronic component may generally have lower reliability when the internal electrode has a small thickness of less than 0.6 μm, in particular, when having a thickness of 0.4 μm or less.

According to another exemplary embodiment of the present disclosure, the internal electrode pattern EP' may have the uniform thickness and the excellent smoothness, and it is thus possible to secure high connectivity of the end of the internal electrode, and the multilayer electronic component may thus secure excellent reliability even when the fired internal electrode has an average thickness of 0.4 μm or less.

Therefore, when the fired internal electrode has the average thickness of 0.4 μm or less by controlling the average thickness of the internal electrode pattern EP', the multilayer electronic component according to the present disclosure may have the more remarkably improved reliability, and may thus more easily have the smaller size and the higher capacitance.

An average thickness of the ceramic green sheet GS may not need to be particularly limited, and may be determined in consideration of a thickness of the dielectric layer to be obtained.

However, according to another exemplary embodiment of the present disclosure, the internal electrode pattern EP' may have the uniform thickness and the excellent smoothness, and it is thus possible to secure the high connectivity of the end of the internal electrode, and the multilayer electronic component may thus secure the excellent reliability even when 0.45 μm or less is an average thickness of the dielectric layer.

Therefore, when the sintered dielectric layer 111 has the average thickness of 0.45 μm or less by controlling the average thickness of the ceramic green sheet GS, the multilayer electronic component according to the present disclosure may have the more remarkably improved reliability, and may thus more easily have the smaller size and the higher capacitance.

The Forming of the Body

The stack body may then be formed by stacking the ceramic green sheets GS on each of which the internal electrode pattern EP' is printed. The stack body may be pressed and crimped in a stack direction (i.e., first direction).

The stack body may then be cut to have a size corresponding to that of a body of one multilayer electronic component to obtain a unit stack body. Here, both ends of the internal electrode pattern may be cut to be alternately exposed to both end surfaces of the body in the second direction.

The body 110 may then be obtained by sintering the unit stack body.

The Forming of the External Electrode

The external electrodes may then be formed on the body to manufacture the multilayer electronic component.

A method of forming the external electrodes is not particularly limited, and may use a method of dipping both the end surfaces of the body into a paste including a conductive metal and glass, or a method of transferring a sheet including the conductive metal. In addition, the external electrode may be formed using the paste including the conductive metal and resin, or using an atomic layer deposition (ALD) method, a molecular layer deposition (MLD) method, a chemical vapor deposition (CVD) method, a sputtering method, etc. In addition, a plating process may be additionally performed so that the external electrode includes a plating layer.

As set forth above, the present disclosure may provide the multilayer electronic component having the improved reliability by improving the connectivity of the end of the internal electrode.

The present disclosure may also provide the multilayer electronic component having the improved capacitance per its unit volume by improving the connectivity of the end of the internal electrode.

The present disclosure may also provide the reliable multilayer electronic component having the smaller size and the higher capacitance.

The present disclosure may also provide the reliable multilayer electronic component having the mass productivity and the shorter manufacturing time.

While the exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including a plurality of dielectric layers and a plurality of first internal electrodes and a plurality of second internal electrodes alternately disposed in a first direction with a dielectric layer interposed therebetween, and including first and second surfaces opposing each other in the first direction, third and fourth surfaces connected to the first and second surfaces and opposing each other in a second direction, and fifth and sixth surfaces connected to the first to fourth surfaces and opposing each other in a third direction;
a first external electrode disposed on the third surface and connected to the plurality of first internal electrodes; and
a second external electrode disposed on the fourth surface and connected to the plurality of second internal electrodes,
wherein the plurality of first internal electrodes are spaced apart from the fourth surface and each include a plurality of first conductor portions and first cut-off portions, and the plurality of second internal electrodes are spaced apart from the third surface and each include a plurality of second conductor portions and second cut-off portions, and
an average value of connectivity of an end of a first internal electrode is 60% or more, wherein E1 is a region from a first conductor portion, which is closest to the second external electrode among the first conductor portions each having thickness and length of 80 nm or more among the plurality of first conductor portions, to a point of 10 μm toward an inner side of the first internal electrode, based on a cross-section of the body in a first-second direction, and the connectivity of the end of the first internal electrode is a ratio of a length of the first internal electrode, occupied by the plurality of first conductor portions in the region E1 to a length of the region E1.

2. The multilayer electronic component of claim 1, wherein an average value of E1s/F1s×100 is 84 or more, wherein F1 is a region of a second internal electrode entirely overlapping the region E1 in the first direction, E1s is an area occupied by the plurality of first conductor portions in the region E1, and F1s is an area occupied by the plurality of second conductor portions in the region F1.

3. The multilayer electronic component of claim 2, wherein the average value of E1s/F1s×100 is a value obtained by measuring values of five pairs of the first internal electrode and the second internal electrode arranged in a center region, among three equally-divided regions of the body in the first direction, based on the cross-section of the body in the first-second direction, and then averaging the measured values.

4. The multilayer electronic component of claim 1, wherein an average value of a length of the end of the first internal electrode is 4.2 μm or less, wherein the length of the end of the first internal electrode is a length of the first internal electrode measured from an outer end of the first conductor portion closest to the second external electrode among the first conductor portions each having the thickness and length of 80 nm or more among the plurality of first conductor portions to a first conductor portion closest to the second external electrode among the first conductor portions each having a length twice a thickness or greater among the plurality of first conductor portions.

5. The multilayer electronic component of claim 4, wherein the average value of the length of the end of the first internal electrode is a value obtained by measuring values of five first internal electrodes arranged in a center region, among three equally-divided regions of the body in the first direction, based on the cross-section of the body in the first-second direction, and then averaging the measured values.

6. The multilayer electronic component of claim 1, wherein the average value of the connectivity of the end of the first internal electrode is an average value obtained by measuring values of five first internal electrodes arranged in a center region, among three equally-divided regions of the body in the first direction, based on the cross-section of the body in the first-second direction, and then averaging the measured values.

7. The multilayer electronic component of claim 1, wherein an average value of connectivity of an end of a second internal electrode is 60% or more, wherein E2 is a region from the second conductor portion, which is closest to the first external electrode among the second conductor portions each having thickness and length of 80 nm or more among the plurality of second conductor portions, to a point of 10 μm toward an inner side of the second internal electrode, and the connectivity of the end of the second internal electrode is a ratio of a length of the second internal electrode, occupied by the plurality of second conductor portions in the region E2, to a length of the region E2.

8. The multilayer electronic component of claim 7, wherein an average value of E2s/F2s×100 is 84 or more, wherein F2 is a region of the first internal electrode entirely overlapping the region E2 in the first direction, E2s is an area occupied by the plurality of second conductor portions in the region E2, and F2s is an area occupied by the plurality of second conductor portions in the region F2.

9. The multilayer electronic component of claim 1, wherein an average value of a length of an end of a second internal electrode among the plurality of second internal electrodes is 4.2 μm or less, wherein the length of the end of the second internal electrode is a length of the second internal electrode measured from an outer end of the second conductor portion closest to the first external electrode among the second conductor portions each having thickness and length of 80 nm or more among the plurality of second conductor portions to a second conductor portion closest to the first external electrode among the second conductor portions each having a length twice a thickness or greater among the plurality of second conductor portions.

10. The multilayer electronic component of claim 1, wherein an average value of connectivity of the first internal electrode is 80% or more, wherein the connectivity of the first internal electrode is a ratio of a length of the first internal electrode, occupied by the plurality of first conductor portions, to a total length of the first internal electrode.

11. The multilayer electronic component of claim 1, wherein the first cut-off portions or the second cut-off portions include at least one of a pore or a dielectric.

12. The multilayer electronic component of claim 1, wherein an average thickness of each of the plurality of first and second internal electrodes is 0.4 μm or less.

13. The multilayer electronic component of claim 1, wherein an average thickness of each of the plurality of dielectric layers is 0.45 μm or less.

14. The multilayer electronic component of claim 1, wherein the body includes a capacitance formation portion including the first internal electrodes and the second internal electrodes alternately disposed in the first direction with a dielectric layer interposed therebetween, and cover portions disposed on two end surfaces of the capacitance formation portion in the first direction, and an average thickness of each of the cover portions is 15 μm or less.

15. The multilayer electronic component of claim 1, wherein a maximum size of the multilayer electronic component in the second direction is 0.66 mm or less and a maximum size in the third direction is 0.33 mm or less.

16. A multilayer electronic component comprising:
a body including a plurality of dielectric layers and a plurality of first internal electrodes and a plurality of second internal electrodes alternately disposed in a first direction with a dielectric layer interposed therebetween, and including first and second surfaces opposing each other in the first direction, third and fourth surfaces connected to the first and second surfaces and opposing each other in a second direction, and fifth and sixth surfaces connected to the first to fourth surfaces and opposing each other in a third direction;
a first external electrode disposed on the third surface and connected to the plurality of first internal electrodes; and
a second external electrode disposed on the fourth surface and connected to the plurality of second internal electrodes,
wherein the plurality of first internal electrodes are spaced apart from the fourth surface and each include a plurality of first conductor portions and first cut-off portions, and the plurality of second internal electrodes are spaced apart from the third surface and each include a plurality of second conductor portions and second cut-off portions, and
wherein an average value of E1s/F1s×100 is 84 or more, wherein based on a cross-section of the body in a first-second direction, E1 is a region from a first conductor portion of a first internal electrode, which is closest to the second external electrode among the first conductor portions each having thickness and length of 80 nm or more among the plurality of first conductor portions, to a point of 10 μm toward an inner side of the first internal electrode, F1 is a region of a second internal electrode entirely overlapping the region E1 in the first direction, E1s is an area occupied by the plurality of first conductor portions in the region E1, and F1s is an area occupied by the plurality of second conductor portions in the region F1.

17. The multilayer electronic component of claim 16, wherein an average value of a length of an end of the first internal electrode is 4.2 μm or less, wherein the length of the end of the first internal electrode is a length of the first internal electrode measured from an outer end of the first conductor portion closest to the second external electrode among the first conductor portions each having the thickness and length of 80 nm or more among the plurality of first conductor portions to a first conductor portion closest to the second external electrode among the first conductor portions each having a length twice a thickness or greater among the plurality of first conductor portions.

18. The multilayer electronic component of claim 17, wherein an average value of connectivity of an end of a second internal electrode is 60% or more, wherein E2 is a region from the second conductor portion, which is closest to the first external electrode among the second conductor portions each having thickness and length of 80 nm or more among the plurality of second conductor portions, to a point of 10 μm toward an inner side of the second internal electrode, and the connectivity of the end of the second internal electrode is a ratio of a length of the second internal electrode, occupied by the plurality of second conductor portions in the region E2, to a length of the region E2.

19. The multilayer electronic component of claim 18, wherein an average value of E2s/F2s×100 is 84 or more, wherein F2 is a region of the first internal electrode entirely overlapping the region E2 in the first direction, E2s is an area occupied by the plurality of second conductor portions in the region E2, and F2s is an area occupied by the plurality of second conductor portions in the region F2.

20. The multilayer electronic component of claim 16, wherein an average value of a length of an end of a second internal electrode is 4.2 μm or less, wherein the length of the end of the second internal electrode is a length of the second internal electrode measured from an outer end of the second conductor portion closest to the first external electrode among the second conductor portions each having thickness and length of 80 nm or more among the plurality of second conductor portions to a second conductor portion closest to the first external electrode among the second conductor portions each having a length twice a thickness or greater among the plurality of second conductor portions.

21. The multilayer electronic component of claim 16, wherein an average value of connectivity of the first internal electrode is 80% or more, wherein the connectivity of the first internal electrode is a ratio of a length of the first internal electrode, occupied by the plurality of first conductor portions, to a total length of the first internal electrode.

22. A multilayer electronic component comprising:
a body including a plurality of dielectric layers and a plurality of first internal electrodes and a plurality of second internal electrodes alternately disposed in a first direction with a dielectric layer interposed therebetween, and including first and second surfaces opposing each other in the first direction, third and fourth surfaces connected to the first and second surfaces and opposing each other in a second direction, and fifth and sixth surfaces connected to the first to fourth surfaces and opposing each other in a third direction;
a first external electrode disposed on the third surface and connected to the plurality of first internal electrodes; and
a second external electrode disposed on the fourth surface and connected to the plurality of second internal electrodes,
wherein the plurality of first internal electrodes are spaced apart from the fourth surface and each include a plurality of first conductor portions and first cut-off portions, and the plurality of second internal electrodes are spaced apart from the third surface and each include a plurality of second conductor portions and second cut-off portions, and
wherein an average value of a length of an end of a first internal electrode is 4.2 μm or less, wherein the length of the end of the first internal electrode is a length of the first internal electrode measured from an outer end of a first conductor portion closest to the second external electrode among the first conductor portions each having thickness and length of 80 nm or more among the plurality of first conductor portions to a first conductor portion closest to the second external electrode among the first conductor portions each having a length twice a thickness or greater among the plurality of first conductor portions.

23. The multilayer electronic component of claim 22, wherein an average value of a length of an end of a second internal electrode is 4.2 μm or less, wherein the length of the end of the second internal electrode is a length of the second internal electrode measured from an outer end of the second conductor portion closest to the first external electrode among the second conductor portions each having the thickness and length of 80 nm or more among the plurality of second conductor portions to a second conductor portion closest to the first external electrode among the second conductor portions each having a length twice a thickness or greater among the plurality of second conductor portions.

24. The multilayer electronic component of claim 22, wherein an average value of connectivity of the first internal electrode is 80% or more, wherein the connectivity of the first internal electrode is a ratio of a length of the first internal electrode, occupied by the plurality of first conductor portions, to a total length of the first internal electrode.

* * * * *